US006788870B1

(12) United States Patent
Maxham et al.

(10) Patent No.: US 6,788,870 B1
(45) Date of Patent: Sep. 7, 2004

(54) ISOTHERMAL FIBER OPTIC TRAY

(75) Inventors: David J. Maxham, Jamesburg, NJ (US); John M. Ruth, Eatontown, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 10/288,947

(22) Filed: Nov. 6, 2002

Related U.S. Application Data

(60) Provisional application No. 60/337,756, filed on Nov. 8, 2001.

(51) Int. Cl.$^7$ ................................................. G02B 6/00
(52) U.S. Cl. ........................................................ 385/135
(58) Field of Search ................................. 385/135, 134, 385/147, 14

(56) References Cited

U.S. PATENT DOCUMENTS

| | | | |
|---|---|---|---|
| 4,342,113 A | 7/1982 | Iwata | 372/33 |
| 4,840,449 A | 6/1989 | Ghanderharizadeh | 385/135 |
| 4,865,413 A | 9/1989 | Hubner et al. | 385/71 |
| 5,066,149 A | 11/1991 | Wheeler et al. | 385/135 |
| 5,067,784 A | 11/1991 | Debortoli et al. | 385/53 |
| 5,245,690 A | 9/1993 | Aida et al. | 385/142 |
| 5,249,252 A | 9/1993 | Noto | 385/135 |
| 5,274,734 A | 12/1993 | Jin et al. | 385/142 |
| 5,285,515 A | 2/1994 | Milanowski et al. | 385/135 |
| 5,457,763 A | 10/1995 | Kerry et al. | 385/135 |
| 5,515,200 A | 5/1996 | Delrosso et al. | 359/341 |
| 5,541,766 A | 7/1996 | Mizrahi et al. | 359/337 |
| 5,572,617 A | 11/1996 | Bernhardt et al. | 385/135 |
| 5,642,219 A | 6/1997 | Ogiya et al. | 359/341 |
| 5,717,712 A | 2/1998 | Swaminathan et al. | 372/107 |
| 5,760,939 A | 6/1998 | Nagarajan et al. | 359/161 |
| 5,761,225 A | 6/1998 | Fidric et al. | 372/6 |
| 5,778,132 A | 7/1998 | Csipkes et al. | 385/132 |
| 5,781,686 A | 7/1998 | Robinson et al. | 385/135 |
| 5,838,858 A | 11/1998 | White | 385/76 |
| 5,917,648 A | 6/1999 | Harker | 359/341 |
| 5,975,769 A | 11/1999 | Larson et al. | 385/53 |
| 5,994,679 A | 11/1999 | DeVeau et al. | 219/530 |
| 6,018,602 A | 1/2000 | Mayor et al. | 385/27 |
| 6,072,931 A | 6/2000 | Yoon et al. | 385/135 |
| 6,094,519 A | 7/2000 | Takeda | 385/138 |
| 6,114,673 A | 9/2000 | Brewer et al. | 219/530 |
| 6,130,982 A | 10/2000 | Diermeier et al. | 385/135 |
| 6,147,795 A | 11/2000 | Derbyshire et al. | 359/337 |
| 6,192,169 B1 | 2/2001 | Cammons et al. | 385/14 |
| 6,246,512 B1 | 6/2001 | Kakui | 359/337 |
| 6,249,634 B1 | 6/2001 | Tenney et al. | 385/135 |
| 6,310,717 B1 | 10/2001 | Naganuma et al. | 359/341.1 |
| 6,311,007 B1 | 10/2001 | Daoud | 385/135 |
| 6,334,020 B1 | 12/2001 | Fujimori et al. | 385/134 |
| 6,359,724 B1 | 3/2002 | Katagiri et al. | 359/333 |
| 6,381,392 B1 | 4/2002 | Hayden et al. | 385/132 |
| 6,381,394 B1 | 4/2002 | Cabrera et al. | 385/135 |
| 6,402,389 B1 | 6/2002 | Steijer et al. | 385/65 |
| 6,424,457 B1 | 7/2002 | Koonmen et al. | 359/337.1 |

OTHER PUBLICATIONS

Kim P. Hansen and Martin Dybendal Nielsen, "L–Band Erbium Doped Fiber amplifiers—Theory and Design," (Jan. 31, 2000).

*Primary Examiner*—Tulsidas C. Patel
(74) *Attorney, Agent, or Firm*—Grossman, Tucker, Perreault & Pfleger, PLLC

(57) ABSTRACT

An isothermal fiber optic tray is used to hold optical fiber, such as erbium doped fiber in an erbium doped fiber amplifier (EDFA). The isothermal fiber optic tray comprises a thermally conductive inner structure providing a substantially isothermal cavity. An insulating outer structure is positioned adjacent first and second sides of the thermally conductive inner structure.

11 Claims, 5 Drawing Sheets

ISOTHERMAL FIBER OPTIC TRAY

RELATED APPLICATIONS

This application claims the benefit of U.S. Provisional Application Serial No. 60/337,756 filed on Nov. 8, 2001, which is fully incorporated herein by reference.

TECHNICAL FIELD

The present invention relates to isothermal chambers and more particularly, to isothermal chambers for use in fiber optic amplifiers.

BACKGROUND INFORMATION

Because of the loss associated with transmitting optical signals over long distances, ultra long haul (ULH) fiber optic telecommunications systems require amplification of the optical signal after a certain distance. Optical amplifiers allow the optical signals to be amplified without having to convert to the electrical domain. In submarine ULH systems with distances of about 7000 km, for example, these optical amplifiers are placed about every 30 to 50 km to compensate for signal attenuation and to boost signal strength. In an undersea environment, the optical amplifiers are housed together with other electrical and optical components in watertight housings (often referred to as repeaters), which are placed in line with the fiber optic cable.

In one type of optical amplifier, rare earth doped optical fiber is pumped with light at the wavelength of the rare earth dopant, thereby causing population inversion of the dopant. The population inversion causes a signal to propagate at a signal wavelength along the fiber, resulting in signal amplification. In some systems, for example, erbium doped fiber amplifiers (EDFAs) use erbium-doped fiber as the source of optical amplification. The erbium doped fiber is pumped with light energy usually coming from a laser, such as a 980 mn laser pump available from Lucent Technologies.

The length of erbium doped optical fiber can be stored in an erbium doped fiber module (EDFM) designed for storing a large quantity of "loose" fiber. The EDFM preferably protects the erbium doped fiber and maintains the erbium doped fiber within a certain temperature range for optimal performance. The temperature inside the EDFM (i.e., in the cavity or chamber where the erbium doped fiber lies) should remain substantially constant so that the output power of the amplifier remains constant or substantially constant. Previous and current designs of the EDFM do not provide an isothermal cavity or chamber for the erbium doped fiber. In fact, most chambers have gradients that are not tolerable with respect to keeping a constant output power. For example, the temperature variation across the cavity in some of these previous designs was in excess of 20° C.

Accordingly, there is a need for a fiber optic tray with an isothermal chamber that is capable of keeping the temperature within the chamber substantially constant. There is also a need for an isothermal chamber capable of working in an undersea environment, for example, where the outside temperature is about 5° F. and the chamber temperature is about 70° F.

SUMMARY

In accordance with one aspect of the present invention, an isothermal fiber optic tray comprises a thermally conductive inner structure providing a substantially isothermal cavity and an insulating outer structure positioned adjacent first and second sides of the thermally conductive inner structure.

In accordance with another aspect of the present invention, a fiber module comprises a housing, first and second conducting plates positioned within the housing to define a substantially isothermal cavity for receiving the optical fiber, and first and second insulation sections positioned within the housing adjacent the respective conducting plates. The fiber module also comprises first and second heaters positioned between the respective conducting plates and insulation sections.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
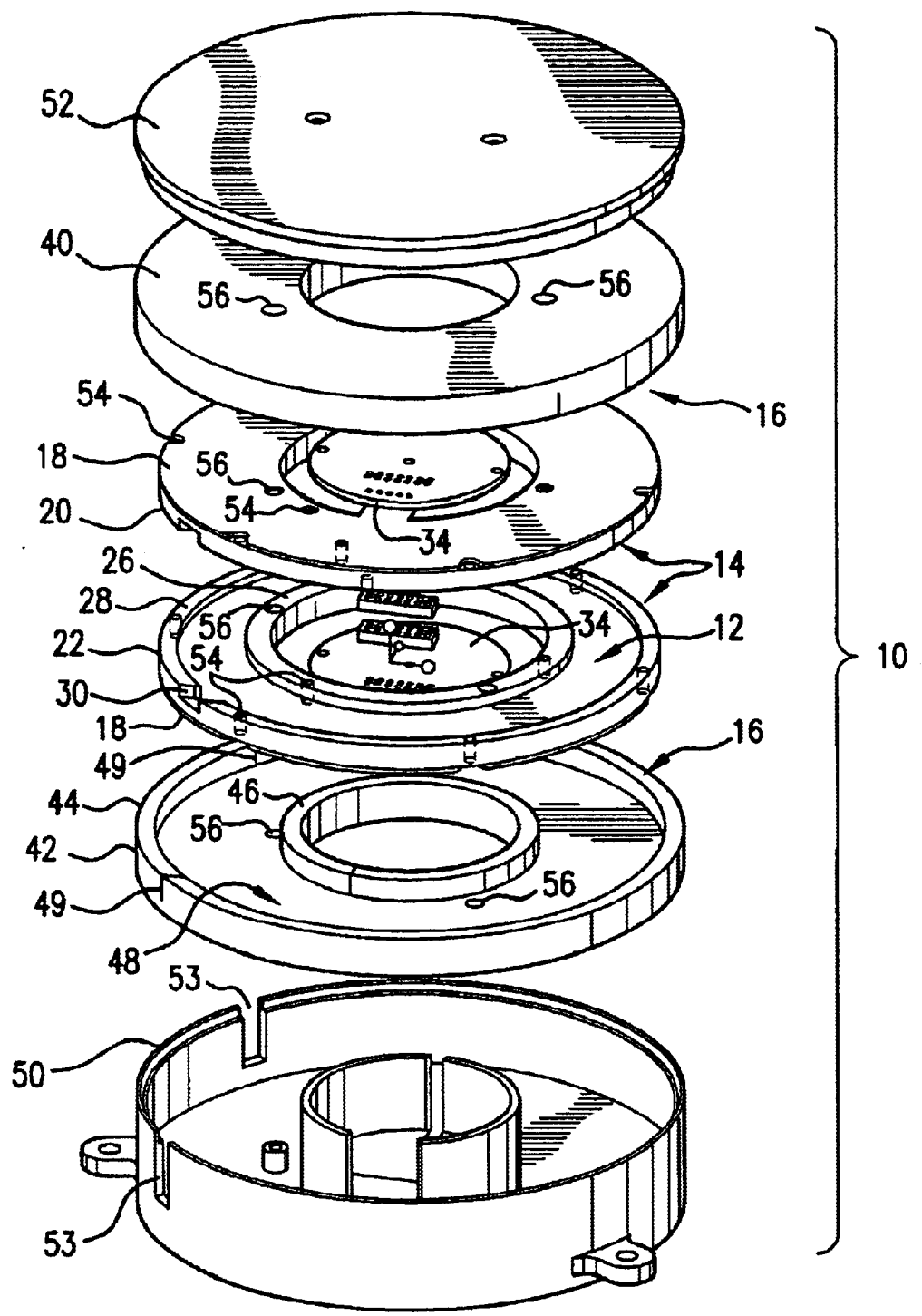
FIG. 1 is an exploded view of an isothermal fiber optic tray, according to one embodiment of the present invention.
Figure 2:
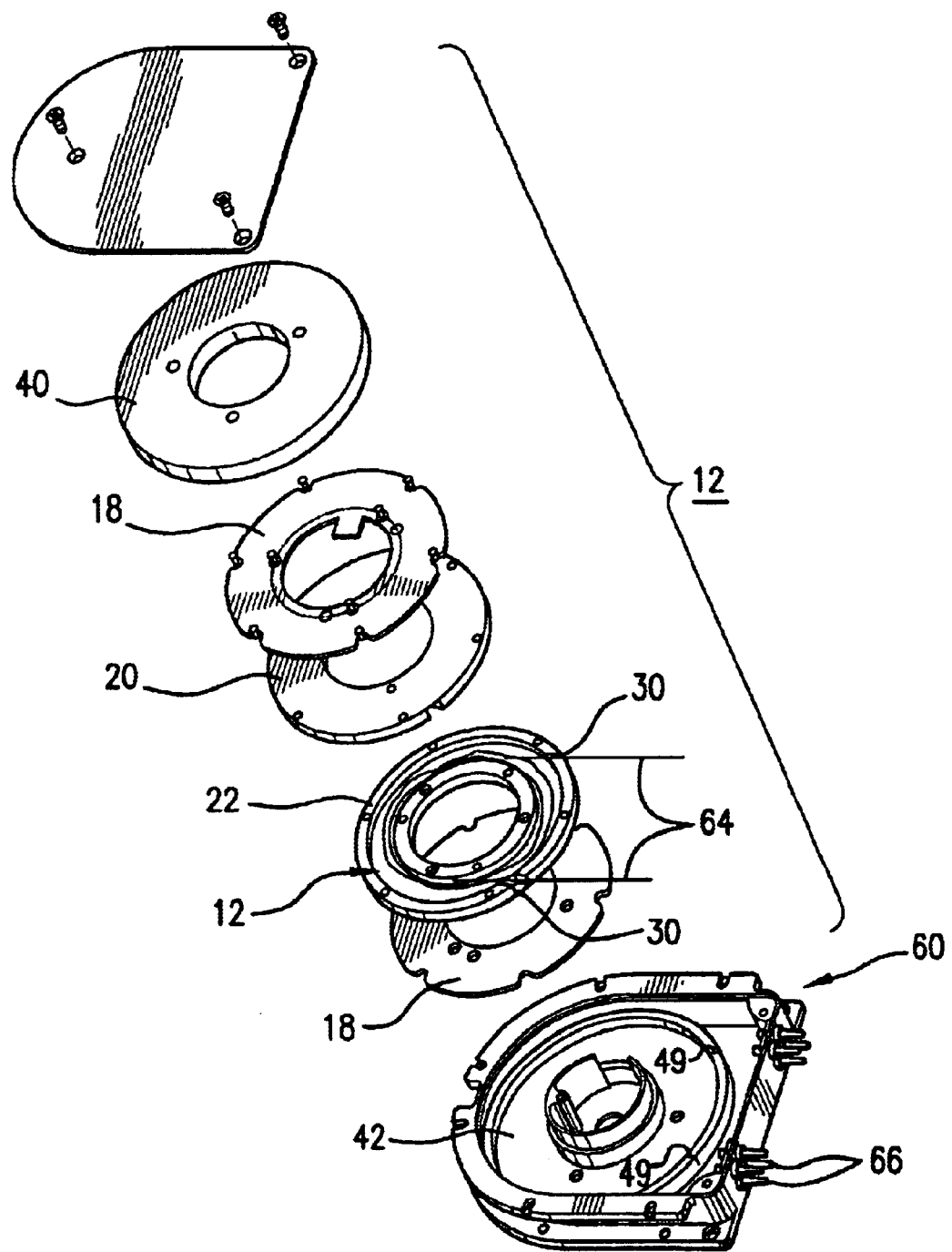
FIG. 2 is an exploded view of an erbium doped fiber module (EDFM) with an isothermal fiber optic tray, according to another embodiment of the present invention.

Referring to FIG. 1, an isothermal fiber optic tray 10 provides a two level approach to creating an isothermal cavity 12 for optical fiber. The term "isothermal" is used herein to mean a substantially constant temperature. In the context of an optical amplifier, the substantially constant temperature means negligible temperature variations within the cavity such that the optical amplifier can maintain a constant or substantially constant output power with a negligible effect on performance. Although the exemplary embodiment discloses an isothermal fiber optic tray 10 providing an isothermal cavity 12 for erbium doped optical fiber in an erbium doped fiber amplifier (EDFA), the isothermal fiber optic tray 10 can be used in other applications where a constant or substantially constant temperature is desired.

The first and inner level of the isothermal fiber optic tray 10 includes a thermally conductive inner structure 14 providing the isothermal cavity 12. The second and outer level of the isothermal fiber optic tray 10 includes an insulating outer structure 16 positioned adjacent the thermally conductive inner structure 14. The thermally conductive inner structure 14 conducts heat from one or more heaters 18 to the isothermal cavity 12. The insulating outer structure 16 reduces variation in temperature that can be caused by external effects, such as cold air blowing over the top and heat from a printed circuit board on the bottom.

The exemplary embodiment of the thermally conductive inner structure 14 includes first and second conducting plates 20, 22. The conducting plates 20, 22 are preferably made of a highly thermally conductive material such as aluminum. Each of the conducting plates 20, 22 includes an inner wall 26 and an outer wall 28 defining the isothermal cavity 12. When assembled, a thermal joint compound is preferably applied to the mating surfaces of the outer wall 28 and/or the inner wall 26 of each of the conducting plates 20, 22 to facilitate heat conduction between the conducting plates 20, 22. One or both of the conducting plates 20, 22 also includes fiber passages 30 through the outer wall 28 allowing the optical fibers to pass into and out of the isothermal cavity 12.

The exemplary embodiment of the heaters 18 includes first and second film heaters adhered (e.g., using a pressure sensitive adhesive) to the respective conducting plates 20, 22. One type of film heater that can be used is available from Minco Products, Inc. The control circuitry 34 for the heaters 18 is preferably contained within the optical fiber tray 10, thus providing a self-contained package that reduces the overall real estate required for the tray 10 and the associated circuitry.

The exemplary embodiment of the insulating outer structure 16 includes first and second insulation sections 40, 42. The insulation sections 40, 42 are preferably made of an insulating material. One example of an insulating material that can be used is an insulating foam such as the type sold under the name PORON. The exemplary embodiment of the insulation sections 40, 42 include inner and outer walls 44, 46 defining an insulating cavity 48 for receiving the respective conducting plates 20, 22. One or both of the insulation sections 40, 42 also includes fiber passages 49 through the outer wall 46, which are generally aligned with the fiber passages 30 in the conducting plates 20, 22. In one preferred embodiment, the fiber passages 49 are formed as slits in the insulating material such that the insulating material holds the fiber and provides some strain relief In one preferred embodiment, the isothermal fiber optic tray 10 is enclosed, for example, in a housing 50 having a cover 52. The housing 50 includes fiber passages 53 corresponding to the fiber passages 30 in the conducing plate(s) 20, 22. The housing 50 can be mounted to a printed circuit board within an optical amplifier. The housing 50 is preferably made of a thermally insulating plastic or polycarbonate material, such as the type sold under the name CELCON.

In the exemplary embodiment, the conducting plates 20, 22 include fastener holes 54 for receiving fasteners to secure the conducting plates 20, 22 together. The conducting plates 20, 22 and the insulation sections 40, 42 include fastener holes 56 for receiving fasteners to secure the insulation sections 40, 42 together with the conducting plates 20, 22. Other well known techniques can also be used to hold the conducting plates 20, 22 and insulation sections 40, 42 together.

Figure 3:
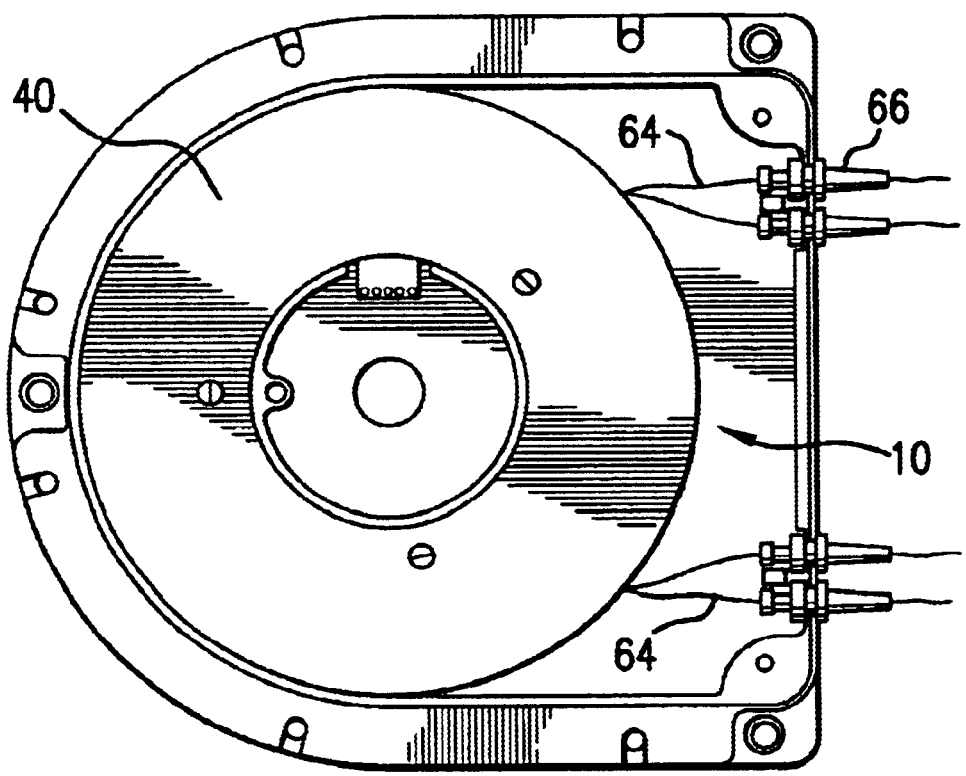
FIG. 3 is a top view of the EDFM shown in FIG. 2 without the cover.
Figure 4:
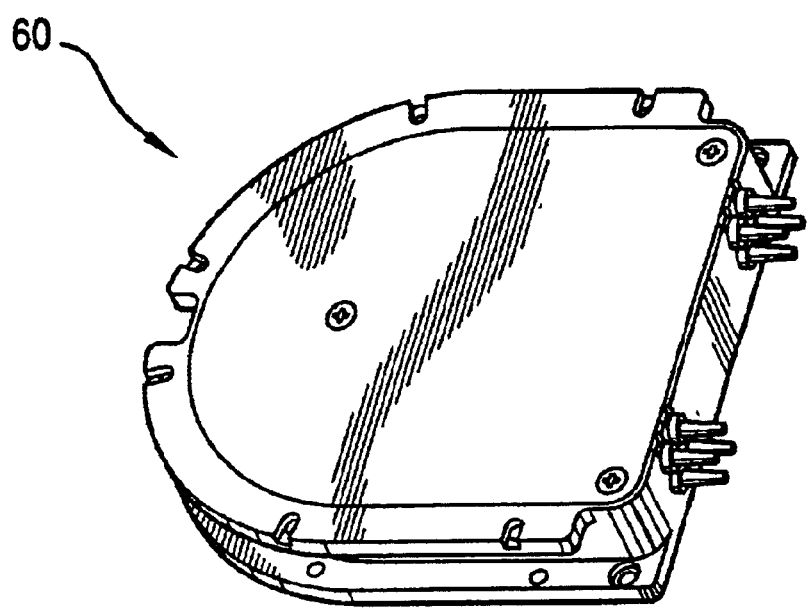
FIG. 4 is a perspective top view of the assembled EDFM shown FIG. 2.
Figure 5:
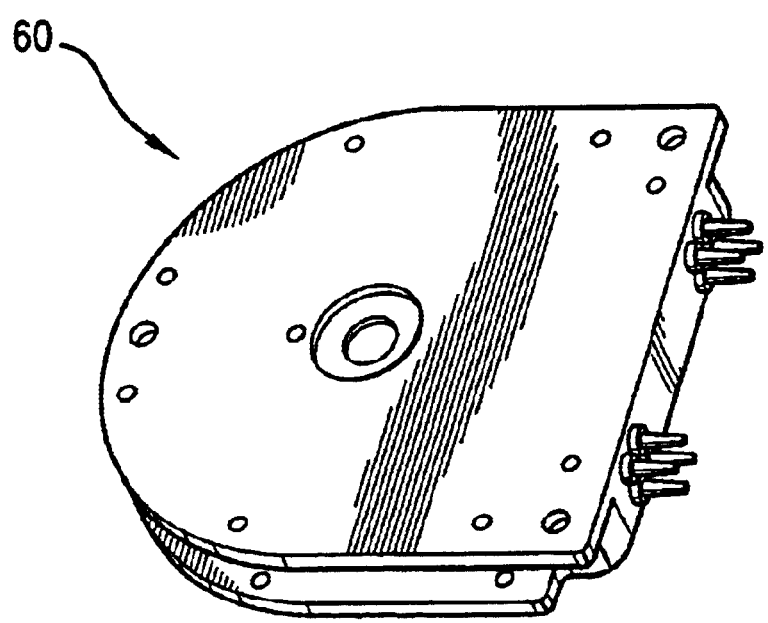
FIG. 5 is a perspective bottom view of the assembled EDFM shown FIG. 2.

In one preferred embodiment shown in FIGS. 2–5, the isothermal fiber optic tray 10 is enclosed in an erbium doped fiber module (EDFM) 60. The erbium doped optical fibers 64 are coiled within the isothermal cavity 12 and pass through the passages 30, 49. In one embodiment, the EDFM 60 includes strain relief boots 66 such as the type available from JDS Uniphase. As shown in FIG. 3, the erbium doped optical fibers 64 pass from the isothermal fiber optic tray 10 through the strain relief boots 66. Another example of an EDFM in which the isothermal fiber optic tray 10 can be used is disclosed in pending application Ser. No. 09/906,964 filed on Jul. 17, 2001, which is incorporated herein by reference.

Figure 6:
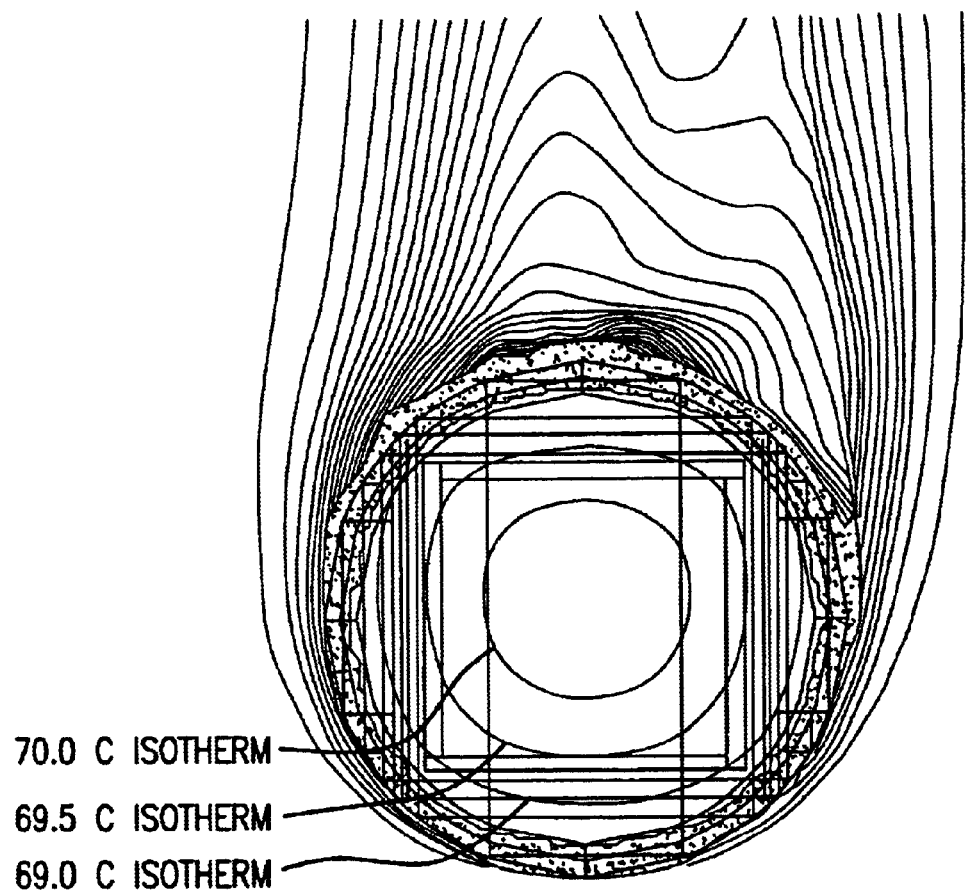
FIG. 6 is a top view showing isothermal lines on one embodiment of the isothermal fiber optic tray.

Based on experimental data, prototypes made according to the present invention were capable of maintaining a temperature variation across the cavity of less than 0.5° C. The temperature variation was calculated as the variation within the cavity about a mean temperature within the cavity. FIG. 6 is a view showing isothermal lines on one embodiment of the isothermal fiber optic tray showing the temperature gradients.

Accordingly, an isothermal fiber optic tray provides an isothermal cavity that maintains a sufficiently constant temperature so that amplification characteristics (i.e., the output power) of an EDFA can be maintained substantially constant with a negligible effect on performance. Using a thermally conducting material within an insulating material that insulates the tray from the effects of convection from the outer surfaces of the EDFM creates the isothermal cavity.

Modifications and substitutions by one of ordinary skill in the art are considered to be within the scope of the present invention, which is not to be limited except by the following claims.

The invention claimed is:

1. An isothermal fiber optic tray comprising:

a thermally conductive inner structure providing an isothermal cavity for holding optical fiber, said thermally conductive inner structure having first and second sides, and wherein said thermally conductive inner structure comprises first and second conducting plates; and an insulating outer structure positioned adjacent said first and second sides of said thermally conductive inner structure, and wherein said insulating outer structure comprises first and second insulation sections receiving respective said first and second conducting plates; and wherein at least one of said conducting plates includes at least one fiber passage and at least one of said insulation sections includes at least one fiber passage aligned with said at least one fiber passage in at least one of said conducting plates, wherein said fiber passages allow the optical fiber to pass into and out of said isothermal cavity.

2. The isothermal fiber optic tray of claim 1 further comprising first and second heaters positioned on said first and second sides of said thermally conductive inner structure and between said thermally conductive inner structure and said insulating outer structure.

3. The isothermal fiber optic tray of claim 2 wherein said heaters include film heaters.

4. The isothermal fiber optic tray of claim 1 wherein said first and second conducting plates are made of aluminum.

5. The isothermal fiber optic tray of claim 1 wherein said at least one fiber passage in said insulation section is a slit for receiving said optical fiber with said insulation section providing strain relief.

6. The isothermal fiber optic tray of claim 1 wherein said insulating outer structure comprises first and second insulation sections receiving said thermally conductive inner structure.

7. The isothermal fiber optic tray of claim 1 further comprising a housing for housing said thermally conductive inner structure and said insulating outer structure.

8. The isothermal fiber optic tray of claim 7 further comprising a cover for covering said housing.

9. The isothermal fiber optic tray of claim 1 wherein said thermally conductive inner structure and said insulating outer structure have a generally circular shape.

10. The isothermal fiber optic tray of claim 1 wherein said insulating outer structure surrounds said thermally conductive inner structure.

11. The isothermal fiber optic tray of claim 10 wherein said thermally conductive inner structure and said insulating outer structure include fiber passages allowing the optical fiber to pass into and out of said isothermal cavity.

* * * * *